(12) United States Patent
Sheldon

(10) Patent No.: X8759
(45) Date of Patent: Apr. 8, 1835

(54) SPINNING & TWISTING STRAW, HAY, &C.

(76) Inventor: Philo G. Sheldon

Philo G. Sheldon
Letters Pattent

The schedule referred to in these Letters Patent and making part of the same
containing a description in the words of the said Philo G. Sheldon himself of
his improvement in the mode of spinning or twisting Straw Hay or other
substances

---

To all whom it may concern. Be it known that I Philo G. Sheldon of
Winchester in the County of Litchfield and State of Connecticut have
invented a new and improved mode of twisting or spinning hay, straw, tow,
or any similar material & in the form of twist or rope for packing or doing up
scythes or other articles of hard ware or for any other purpose to which such
twist or rope may be applied & I do hereby declare that the following is a
full & exact description of the apparatus or machinery which I employ
for that purpose. I make a spindle which is furnished with flyers & a spool
or drum much in the form of the spindles flyers & bobbin used in the spinning
of hemp cotton or other fibrous materials but so modified in size & form
& in the nature of certain of its appendages as to adapt them [illegible] to the
special purpose to which I apply it & for which it has not heretofore been
employed. I form a spindle of wood or metal but most generally of iron
which may be ten feet in length more or less. this however in practice I
have found a good length. this spindle I place horizontally supporting
it upon proper bearings or boxes near its ends. The spindle is hollow at its
head or has an eye or opening through which the material to be spun
is to pass in a manner common to such spindles. Just below the later
al opening from the said hollow end arms project out on opposite sides
& are so wrought as to form large flyers adapted to the spindle. which flyers
may also be made of wood [illegible] of metal or of the two combined together
& to sustain them I usually unite their extreme ends by a crosspiece ex
tending from one to the other. Upon the spindle & within the flyers I
place a bobbin or drum with suitable heads to receive the spun materi
als as it is delivered from the flyers & to said spool I apply a friction pul
ley ley with a band & weights or employ other well known means to eetard &
eegulate its motion Upon one arm or side of the flyers I use two or more
pulleys or hooks upon which to place the rope while it is being spun or
twisted so as to conduct it on to its proper place on the drum or spool;
when two only are employed that which conducts it on the spool or
drum must be made to slide or shift along the whole length thereof. A hook
or other contrivance is used to attach the rope to the drum in the first
instance when the spinning is commenced. Motion may be given to
the spindle by means of a wheel & band or otherwise. What I claim as
my invention is the adaptation of a spindle with its appendages as here-
in described to the purpose and in the manner set forth. I claim no-
thing more, the general principle of its action being similar to that
in other spinning apparatus Witnesses
Bissett Hinsdale
Theo. Hinsdale Philo G. Sheldon Ex?
C.A.W.